United States Patent
Ma

(10) Patent No.: US 9,764,795 B2
(45) Date of Patent: Sep. 19, 2017

(54) INTERLOCKED BOTTOM BRACKET BEARING DEVICE

(71) Applicant: E-MA INTERNATIONAL CORP., Taichung (TW)

(72) Inventor: Huang-Kun Ma, Taichung (TW)

(73) Assignee: E-MA INTERNATIONAL CORP., Taichung (TW)

( * ) Notice: Subject to any disclaimer, the term of this patent is extended or adjusted under 35 U.S.C. 154(b) by 66 days.

(21) Appl. No.: 14/987,132

(22) Filed: Jan. 4, 2016

(65) Prior Publication Data
US 2016/0272268 A1 Sep. 22, 2016

(30) Foreign Application Priority Data
Mar. 17, 2015 (TW) ................. 104203971 U

(51) Int. Cl.
*F16C 9/00* (2006.01)
*B62M 3/00* (2006.01)

(52) U.S. Cl.
CPC .................. *B62M 3/003* (2013.01)

(58) Field of Classification Search
CPC ........ F16C 19/08; F16C 19/18; F16C 19/181; F16C 19/182; F16C 19/183; F16C 19/184; F16C 35/077; F16C 2326/28; B60B 27/0005; B62K 19/34; B62M 3/003
See application file for complete search history.

(56) References Cited

U.S. PATENT DOCUMENTS

| 4,651,590 A | 3/1987 | Thun | |
|---|---|---|---|
| 9,004,771 B2 * | 4/2015 | Earle | B62M 3/003 384/458 |
| 2002/0096015 A1 * | 7/2002 | Smith | B62M 3/003 74/594.1 |
| 2003/0097901 A1 * | 5/2003 | Yamanaka | B25B 15/005 74/594.1 |
| 2016/0272268 A1 | 9/2016 | Ma | |

FOREIGN PATENT DOCUMENTS

| DE | 3441540 A1 | 5/1986 | |
|---|---|---|---|
| DE | 3531030 A1 * | 3/1987 | B62K 19/34 |
| FR | 2643121 A * | 8/1990 | |
| TW | M35419 U | 5/2009 | |
| TW | I310356 B | 6/2009 | |
| TW | M460040 U | 8/2013 | |

\* cited by examiner

*Primary Examiner* — Phillip A Johnson
(74) *Attorney, Agent, or Firm* — Muncy, Geissler, Olds & Lowe, P.C.

(57) ABSTRACT

An interlocked bottom bracket bearing device is provided, including an axial tube, two bottom bracket bearing assemblies and two annular members. The axial tube includes a first end and a second end. Each said bottom bracket bearing assembly includes a small-diameter portion and a large-diameter portion. Said two small-diameter portions are respectively assembled to the first and second ends. A side of each said large-diameter portion is radially and annularly formed with a protruding flange. Said two annular members are respectively sleeved on said two large-diameter portions. The annular members are abutted against the protruding flanges. Wherein said two bottom bracket bearing assemblies are located on two opposite sides of the bottom bracket tube, the annular member is radially clamped and a portion of the annular member is axially clamped between the protruding flange and a side wall of bottom bracket tube.

10 Claims, 3 Drawing Sheets

INTERLOCKED BOTTOM BRACKET BEARING DEVICE

BACKGROUND OF THE INVENTION

Field of the Invention

The present invention relates to a bottom bracket bearing assembly, and more particularly to an interlocked bottom bracket bearing device.

Description of the Prior Art

A prior art of bottom bracket bearing assembly is disclosed in TWI310356. A structure of the prior art primarily includes two support bases, two bearing bases and two bearing devices. The bearing devices are disposed in receiving space of the bearing bases. The support bases are assembled to a bottom bracket tube and an axle is penetrated through the bottom bracket tube. Two ends of the axle are penetrated through and engaged with the bearing devices.

However, the structure of the bottom bracket bearing assembly as described above is screwed to the bottom bracket tube via threads. In other words, the structure described above can't be assembled to a bottom bracket tube without threads. And the bottom bracket tube without threads is usually assembled in a way of tight fit. Nevertheless, there are risks of releasing in tight fit assembling. For example, there is clearance induced between parts in assembling process so that the parts are easily released after assembling. And it will cause the parts to fall apart when riders are riding bicycles and cause the riders to get injured. It is important to make sure that the bottom bracket bearing assembly and the bottom bracket tube are assembled tightly.

The present invention has arisen to mitigate and/or obviate the afore-described disadvantages.

SUMMARY OF THE INVENTION

The primary object of the present invention is to provide an interlocked bottom bracket bearing device. Bottom bracket bearing assemblies are provided with deformable annular members and are for being slightly deformed and tightly engaged between the bottom bracket bearing assemblies and the bottom bracket tube as applying force to assemble the bottom bracket bearing assemblies and the bottom bracket tube. There is no clearance between the bottom bracket bearing assemblies and the bottom bracket tube and a stability of assembling is increased to prevent the bottom bracket bearing assemblies from releasing and increase a safety of riding the bicycle. Furthermore, the annular member has a chamfer portion which is for conveniently guiding and assembling to the bottom bracket tube. It increases efficiency and convenience of assembling.

To achieve the above object, an interlocked bottom bracket bearing device is provided, for assembling to a bottom bracket tube of a bicycle. The bottom bracket tube is formed with an inner annular surface. The interlocked bottom bracket bearing device includes an axial tube, two bottom bracket bearing assemblies and two annular members. The axial tube includes a first end and a second end and is for being disposed into the bottom bracket tube. Each said bottom bracket bearing assembly includes a small-diameter portion and a large-diameter portion. Said two small-diameter portions of the two bottom bracket bearing assemblies are respectively assembled to the first and second ends of the axial tube. A side of each said large-diameter portion of the bottom bracket bearing assembly is radially and annularly formed with a protruding flange. Said two annular members are respectively sleeved on said two large-diameter portions of the two bottom bracket bearing assemblies. The annular members are abutted against the protruding flanges. Wherein said two bottom bracket bearing assemblies are located on two opposite sides of the bottom bracket tube, the annular member is radially clamped between the large-diameter portion and the inner annular surface, and a portion of the annular member is axially clamped between the protruding flange and a side wall of the bottom bracket tube.

DETAILED DESCRIPTION OF THE PREFERRED EMBODIMENTS

The present invention will be clearer from the following description when viewed together with the accompanying drawings, which show, for purpose of illustrations only, the preferred embodiment in accordance with the present invention.

Figure 1:
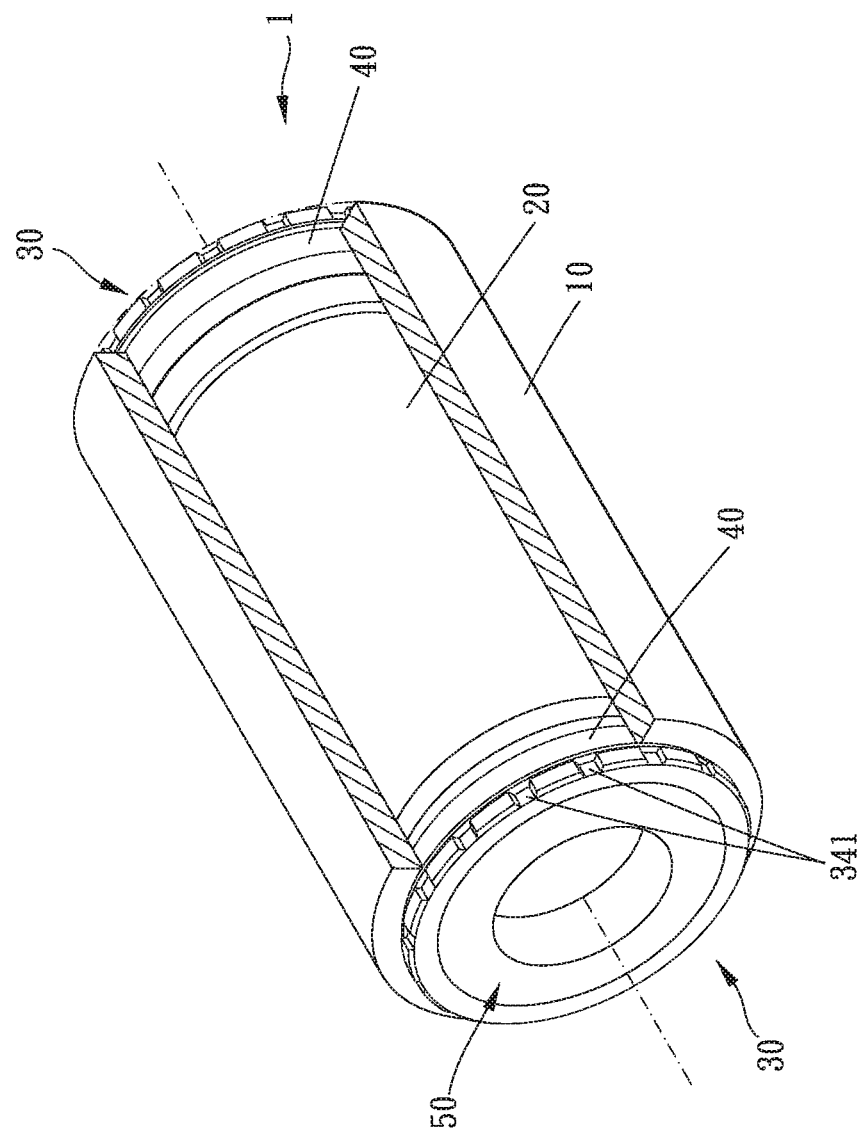
FIG. 1 is a perspective drawing of a preferred embodiment of the present invention.
Figure 2:
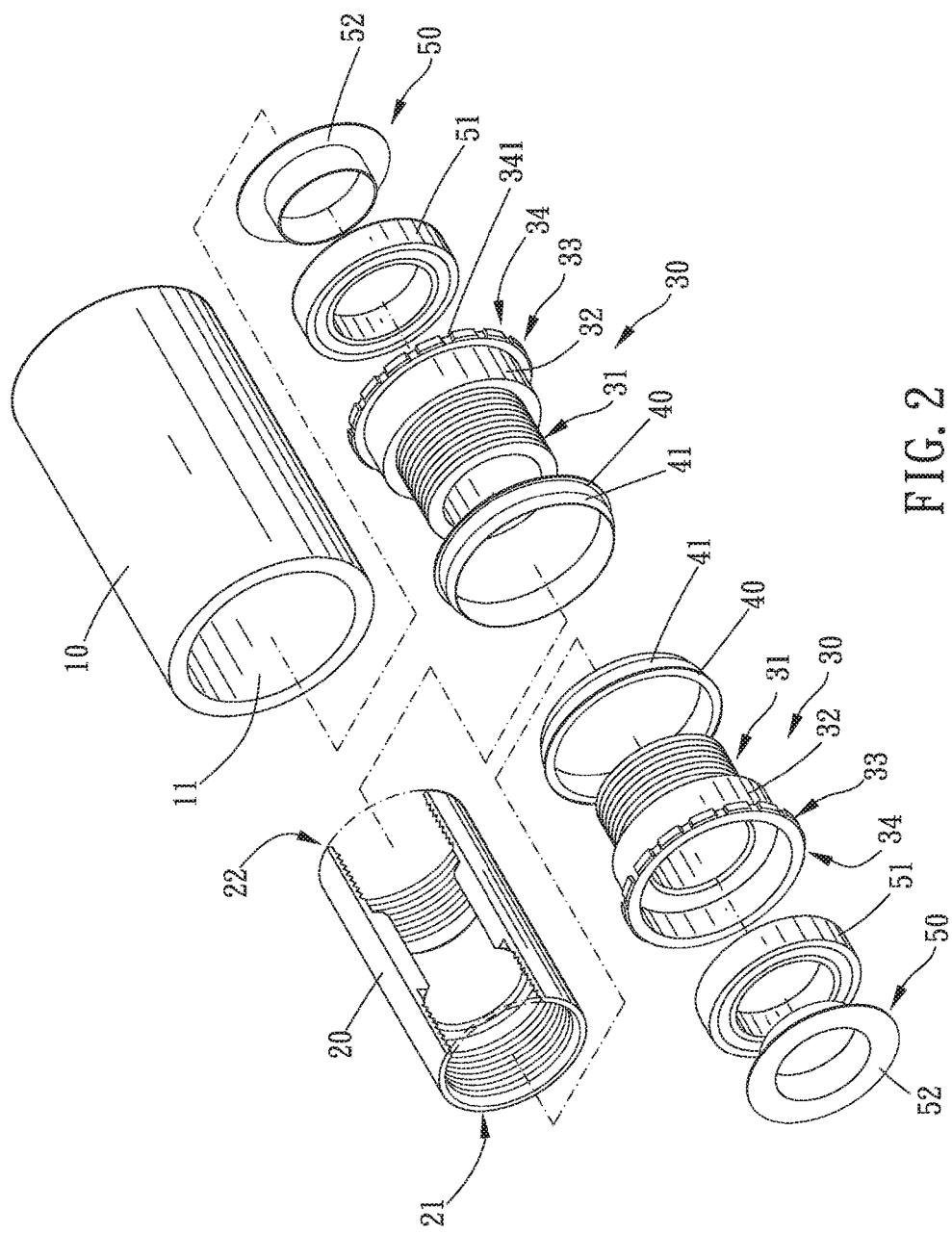
FIG. 2 is a breakdown drawing of the preferred embodiment of the present invention.
Figure 3:
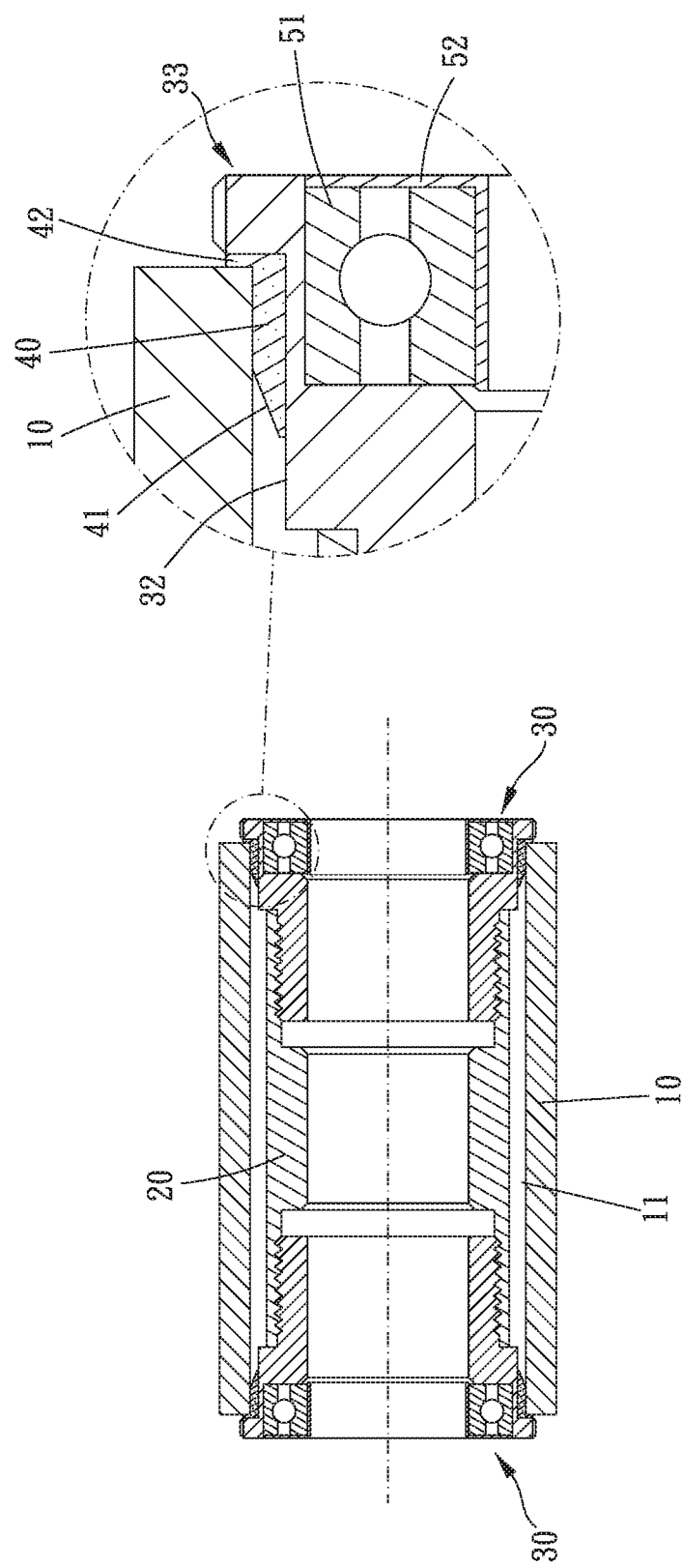
FIG. 3 is a cross-sectional drawing of the preferred embodiment of the present invention.

Referring to FIGS. 1-3, an interlocked bottom bracket bearing device 1 in accordance with a preferred embodiment of the present invention is for assembling to a bottom bracket tube 10 of a bicycle, and the bottom bracket tube 10 is formed with an inner annular surface 11. The interlocked bottom bracket bearing device 1 includes an axial tube 20, two bottom bracket bearing assemblies 30 and two annular members 40.

The axial tube 20 is for being disposed into the bottom bracket tube 10 and includes a first end 21 and a second end 22. Specifically, the first end 21 and the second end 22 of the axial tube 20 are communicated with each other. Each one of the two bottom bracket bearing assemblies 30 includes a small-diameter portion 31 and a large-diameter portion 32. Said two small-diameter portions 31 of the two bottom bracket bearing assemblies 30 are respectively assembled to the first and second ends 21, 22 of the axial tube 20. For example, in the present embodiment, said two small-diameter portions 31 of the two bottom bracket bearing assemblies 30 are respectively provided with outer threads and screwed to inner holes of the first and second ends 21, 22 of the axial tube 20.

Furthermore, a side of each said large-diameter portion 32 of the bottom bracket bearing assembly 30 is radially and annularly formed with a protruding flange 33. The protruding flange 33 is formed with a driving portion 34, and the driving portion 34 is for being engagingly assembled with a driving tool. For example, the driving portion 34 includes a plurality of notches 341 which are circumferentially spaced. The notches 341 are for engagingly assembling with protrusions of the driving tool. The driving tool is such as a wrench or other tool, and the driving tool is for applying a force to tightly screw the bottom bracket bearing assembly 30 and the axial tube 20.

Said two annular members 40 are respectively sleeved on said two large-diameter portions 32 of the two bottom bracket bearing assemblies 30. Specifically, the annular member 40 is entirely sleeved on a circumferential surface of the large-diameter portion 32. The annular members 40 are abutted against the protruding flanges 33. An end of the annular member 40 is annularly formed with a chamfer portion 41, and the chamfer portion 41 is gradually tapered toward the small-diameter portion 31. The annular member 40 is the elastic ring consisting of PP, POM, PVC or other plastic materials. The annular member 40 is preferably stretchable and deformable.

In practical use, the large-diameter portion 32 of the bottom bracket bearing assembly 30 includes a bearing assembly 50. The bearing assembly 50 includes a bearing ring 51 and a dust cover 52. The bearing assembly 50 is for assembling to an axle. During assembling processes, the two annular members 40 are respectively sleeved on the large-diameter portions 32 of the two bottom bracket bearing assemblies 30 in advance. The axial tube 20 is screwed to one of the two bottom bracket bearing assemblies 30 and is disposed into the bottom bracket tube 10. And then the other one of the two bottom bracket bearing assemblies 30 is screwed to the other end of the axial tube 20. One of the two bottom bracket bearing assemblies 30 is fixed by using a tool and the other one of the two bottom bracket bearing assemblies 30 is driven by the driving tool with force to tightly screw the two bottom bracket bearing assemblies 30. It is noted, the chamfer portion 41 is for conveniently guiding the annular member 40 to assemble to the bottom bracket tube 10 in the assembling processes.

When said two bottom bracket bearing assemblies 30 are located on two opposite sides of the bottom bracket tube 20, the annular member 40 is radially clamped between the large-diameter portion 32 and the inner annular surface 11, and a portion of the annular member 40 is axially clamped between the protruding flange 33 and a side wall of the bottom bracket tube 10. Specifically, the annular member 40 is further radially formed with a stop flange 42, and the stop flange 42 is clamped between the protruding flange 33 and the side wall of the bottom bracket tube 10. An inner circumferential surface and an outer circumferential surface of the annular member 40 are respectively tightly engaged with a surface of the large-diameter portion 32 and the inner annular surface 11. It is noted, the annular member 40 is stretchable and deformable. When the bottom bracket bearing assemblies 30 are screwed via the driving tool with force, the annular member 40 is slightly deformed and tightly engaged between the bottom bracket bearing assemblies 30 and the bottom bracket tube 10. Preferably, there is no clearance between the bottom bracket bearing assemblies 30 and the bottom bracket tube 10, and a stability of assembling the bottom bracket bearing assemblies 30 and the bottom bracket tube 10 is increased. It prevents that the bottom bracket bearing assemblies 30 are released during riding the bicycle, and it increases a safety of riding the bicycle.

As a conclusion, the bottom bracket bearing assemblies are provided with said deformable annular members and are for being slightly deformed and tightly engaged between the bottom bracket bearing assemblies and the bottom bracket tube as applying force to assemble the bottom bracket bearing assemblies and the bottom bracket tube. There is no clearance between the bottom bracket bearing assemblies and the bottom bracket tube and a stability of assembling is increased to prevent the bottom bracket bearing assemblies from releasing and increase a safety of riding the bicycle. Furthermore, the annular member has the chamfer portion which is for conveniently guiding and assembling to the bottom bracket tube. It increases efficiency and convenience of assembling.

While we have shown and described various embodiments in accordance with the present invention, it should be clear to those skilled in the art that further embodiments may be made without departing from the scope of the present invention.

What is claimed is:

1. An interlocked bottom bracket bearing device, for assembling to a bottom bracket tube of a bicycle, the bottom bracket tube formed with an inner annular surface, the interlocked bottom bracket bearing device comprising:
   an axial tube, including a first end and a second end, for being disposed into the bottom bracket tube;
   two bottom bracket bearing assemblies, each bottom bracket bearing assembly including a small-diameter portion and a large-diameter portion, said two small-diameter portions of the two bottom bracket bearing assemblies respectively assembled to the first and second ends of the axial tube, a side of each said large-diameter portion of the bottom bracket bearing assembly radially and annularly formed with a protruding flange;
   two annular members, respectively sleeved on said two large-diameter portions of the two bottom bracket bearing assemblies, the annular members abutted against the protruding flanges;
   wherein said two bottom bracket bearing assemblies are located on two opposite sides of the bottom bracket tube, the annular member is radially clamped between the large-diameter portion and the inner annular surface, and a portion of the annular member is axially clamped between the protruding flange and a side wall of the bottom bracket tube.

2. The interlocked bottom bracket bearing device as claimed in claim 1, wherein the annular member is further radially formed with a stop flange, and the stop flange is clamped between the protruding flange and the side wall of the bottom bracket tube.

3. The interlocked bottom bracket bearing device as claimed in claim 1, wherein an inner circumferential surface and an outer circumferential surface of the annular member are respectively tightly engaged with a surface of the large-diameter portion and the inner annular surface.

4. The interlocked bottom bracket bearing device as claimed in claim 1, wherein an end of the annular member is annularly formed with a chamfer portion, and the chamfer portion is gradually tapered toward the small-diameter portion.

5. The interlocked bottom bracket bearing device as claimed in claim 1, wherein said two small-diameter portions of the bottom bracket bearing assemblies are respectively screwed to the first and second ends of the axial tube.

6. The interlocked bottom bracket bearing device as claimed in claim 1, wherein the protruding flange is formed with a driving portion, and the driving portion is for being engagingly assembled with a driving tool.

7. The interlocked bottom bracket bearing device as claimed in claim 6, wherein the driving portion includes a plurality of notches which are circumferentially spaced.

8. The interlocked bottom bracket bearing device as claimed in claim 1, wherein the annular member is an elastic ring.

9. The interlocked bottom bracket bearing device as claimed in claim 8, wherein the annular member is the elastic ring consisting of PP, POM or PVC.

10. The interlocked bottom bracket bearing device as claimed in claim 1, wherein the annular member is entirely sleeved on a circumferential surface of the large-diameter portion.

* * * * *